July 18, 1944.　　　　B. ULINSKI　　　　2,354,178
CHAIN WINDING MECHANISM FOR INDUSTRIAL TRUCKS
Filed July 31, 1942　　　2 Sheets-Sheet 1
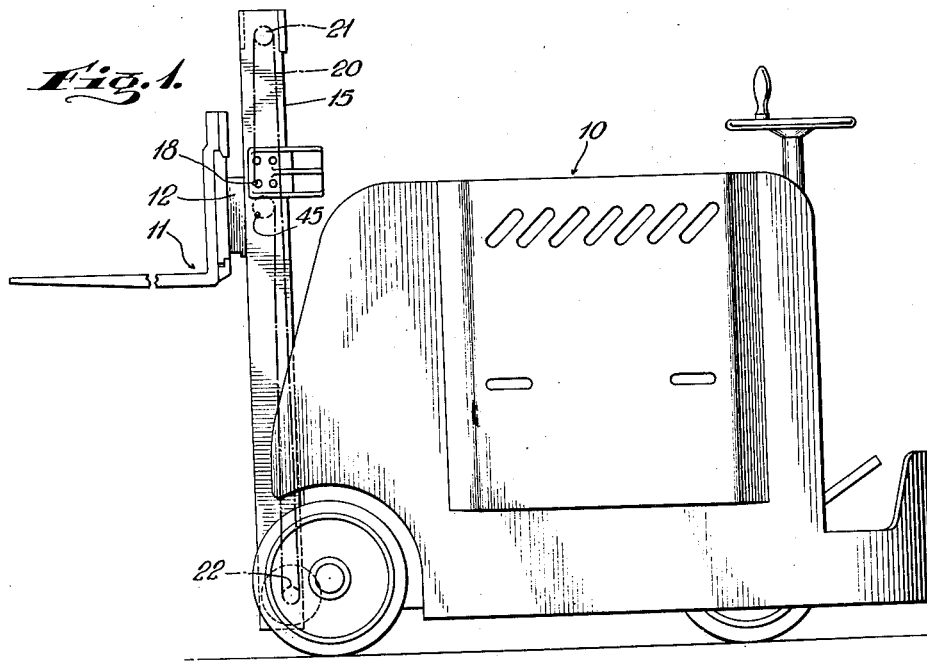
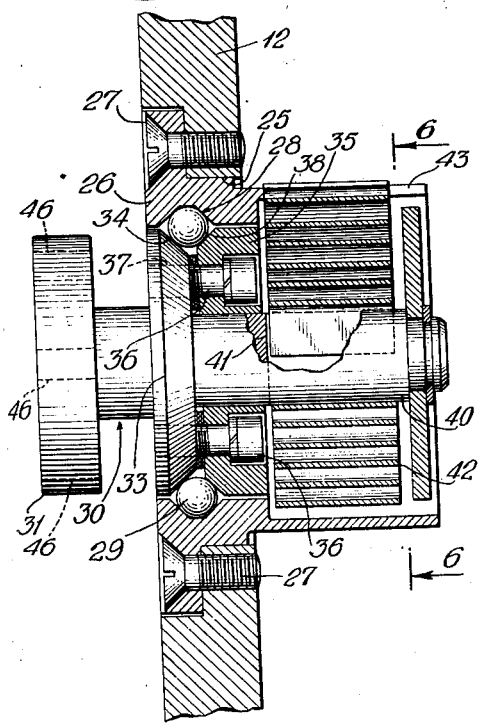
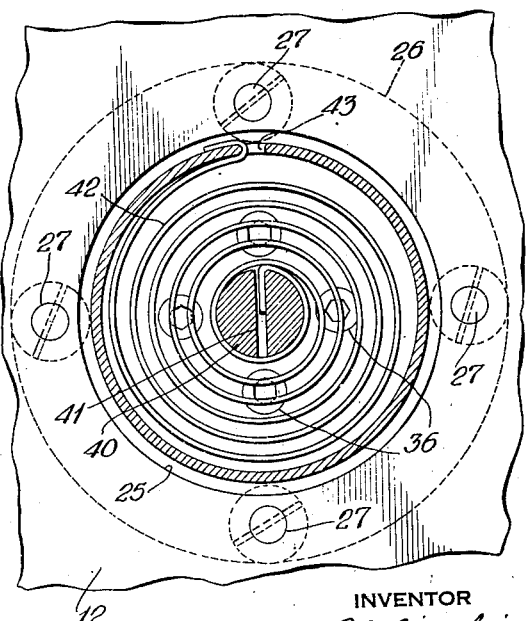
INVENTOR
B. Ulinski
BY A. H. Golden
ATTORNEY July 18, 1944.　　　　B. ULINSKI　　　　2,354,178
CHAIN WINDING MECHANISM FOR INDUSTRIAL TRUCKS
Filed July 31, 1942　　　2 Sheets-Sheet 2
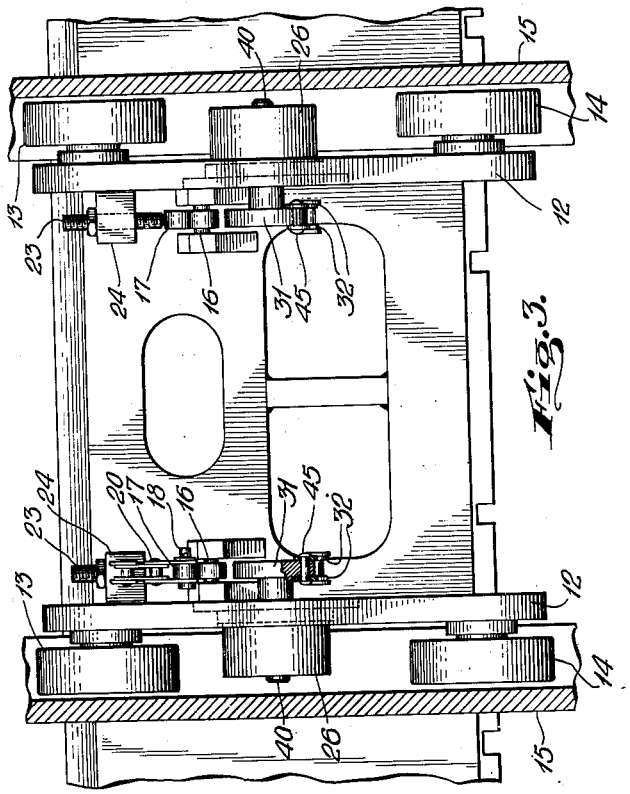
INVENTOR
B. Ulinski
BY
A. H. Golden
ATTORNEY Patented July 18, 1944

2,354,178

UNITED STATES PATENT OFFICE 2,354,178

CHAIN WINDING MECHANISM FOR INDUSTRIAL TRUCKS

Bronislaus Ulinski, Chicago, Ill., assignor to The Yale & Towne Manufacturing Company, Stamford, Conn., a corporation of Connecticut Application July 31, 1942, Serial No. 453,123

8 Claims. (Cl. 187—9)

This invention relates to an industrial truck of the type in which a carriage is mounted for elevating movement on the main frame of the truck, and is elevated by a sprocket chain secured to the carriage and actuated by a power sprocket on the truck. In trucks of the particular type the slack side of the chain generally extends from the sprocket back to the carriage, and those skilled in the art fully appreciate that such slack as occurs in the slack side of the chain must be taken up by suitable means. In my Patent No. 2,207,688 issued on July 9, 1940, I show slack absorbing means in the form of a pair of levers, one for each chain on each side of the carriage, these levers being spring pressed to absorb the slack in the chains.

Levers and such other means as have been developed by the prior art have certain inherent limitations, and the art has long sought a truly effective mechanism for absorbing the slack in the sprocket lifting chains of industrial trucks. Those skilled in the art fully appreciate that in a lever type of slack absorbing means such as shown in my patent, there is a relatively low limit to the amount of slack that may be absorbed by the pivotal movement of the lever, it being obvious that the lever cannot be too large nor have too much movement. It is also appreciated that as the lever moves, the end of the chain moves also and the location of the chain relatively to the carriage is changed. In such slack absorbing mechanisms as involve linear moving means actuated by compression and tension springs, there is of course also a very low limit to the amount of linear movement obtainable since the springs cannot be of too great size.

My invention contributes to the truck art a slack absorbing mechanism which is in the form of a rotating chain winding member that is rotated in a direction to absorb the slack chain, thereby effecting a storing of the chain within a very limited space while not affecting in any way the location and alignment of the chain relatively to the truck and the elevating carriage.

As a feature of my invention, the chain winding member may have its winding portion in the form of a rotating disk to which the end of the chain is secured. Still a further feature of my invention resides in the means for mounting the chain winding member relatively to the carriage. As a further detailed feature of this portion of my invention the chain winding member is mounted for rotation relatively to the carriage on anti-friction bearings, and is assembled to those anti-friction bearings and thereby to the carriage, in a new and novel manner.

A further feature of my invention resides in the manner of mounting and operation of a torsion spring that is adapted to operate between the chain winding member and the carriage for rotating the chain winding member to wind the chain.

While I have thus described generally the more important features of my invention, other valuable features will become apparent upon a reading of the description of my invention that follows. Those skilled in the art will fully appreciate that the basic conception of my invention may be incorporated in structural forms other than that which I shall herein describe, and that my patent claims should be sufficiently broad to prevent the appropriation by others of that basic conception in such other forms.

For a description of my invention I shall refer to the drawings wherein Fig. 1 is a vertical view of a typical industrial truck to which my invention may be applied. Fig. 2 is a vertical section through the truck of Fig. 1 showing the construction of my invention. Fig. 3 is a view taken along lines 3—3 of Fig. 2. Figs. 4 and 5 are respectively sections taken along lines 4—4 and 5—5 of Fig. 2. Fig. 6 is a view taken endwise of Fig. 5 in the direction of the arrows 6—6.

Referring now more particularly to the drawings, a typical industrial truck is designated in Fig. 1 by reference numeral 10 and may be of any desired construction. It should be understood that my invention is applicable to any industrial truck utilizing chains for lifting an elevating carriage. In the electric truck shown in Fig. 1 the carriage is designated generally by reference numeral 11 and as herein shown is of the fork type. Forming a part of the carriage is a bearing member 12, that has secured thereto upper and lower rollers 13 and 14 respectively, whereby the bearing member and the carriage 11 may move vertically on the uprights 15 of the truck 10. In describing my invention from this point, I shall refer to but one side of the truck, since it is quite clear that the mechanism is the same at each side.

Pivoted to each side of the bearing member 12 at 16 is a lever 17 to which is secured at 18 the sprocket lifting chain 20. This sprocket lifting chain 20, in the particular truck illustrated, is adapted to be wound over the teeth of an idler sprocket 21 mounted on the upper end of an upright 15 as is probably best illustrated in Figs. 1 and 2. The chain then passes downwardly and about the teeth of a power sprocket 22. It is obvious that rotation of the power sprocket in the usual way by a motor pulls the chain 20 over the idler sprocket 21 and lifts the carriage 11 and the mounting member 12 relatively to the uprights 15. For adjusting the chain 20, I utilize an adjusting screw 23 that is screw threaded into an abutment 24 fixed to the mounting member 12 of the carriage 11. Through this screw 23 the lever 17 may be adjusted, all for a purpose which will be quite apparent to those skilled in the art. At this point it will be well to indicate that the construction I have thus far described is typical of constructions found in the prior art and therefore per se is not my invention. My invention relates to the means for absorbing the slack in the chain, which slack is developed between the power sprocket 22 and the point where the slack end of the chain is secured preferably relatively to the carriage 11.

Referring now more particularly to Figs. 4, 5 and 6 I shall describe the means whereby the slack end of the chain 20 is secured relatively to the carriage and whereby the slack in the said chain is absorbed. Those skilled in the art will fully appreciate that there are two such slack absorbing means, one for each chain at each side of the carriage. In Fig. 5 the bearing member 12 of the carriage 11 is shown formed with a circular opening 25 into which is set a bearing support 26 for the chain winding member. This bearing support is suitably secured to the mounting member 12 by a series of screws 27 so as to form an integral part thereof. A circular groove 28 is formed in the bearing support 26 for a series of ball bearings 29. The chain winding member of my invention is designated generally by reference numeral 30 and is formed with disk portion 31 of such thickness as to fit between the plates 32 of the chain 20 and thus hold the chain against lateral movement relatively and off the said disk 31.

Forming a further part of the chain winding member 30 is a portion 33 having a beveled surface 34 that is cooperable with the ball bearings 29 as best seen in Fig. 4. A securing member 35 in the form of a circular disk is adapted to be fastened to the chain winding member 30 by a series of bolts 36 threaded into openings 37 formed in the portion 33 of the chain winding member. The securing disk 35 has a beveled surface 38 which is complementary to the surface 34 whereby when the chain winding member and the securing disk 35 are secured to one another, they are also secured relatively to the ball bearings 29 and the bearing support 26. In this way the chain winding member is effectively mounted and secured for rotation.

The chain winding member 30 has a shaft portion 40 that is slotted at 41 for the insertion of one end of a torsion spring 42. The other end of the torsion spring 42 fits into a slot 43 of the bearing support 26, it being obvious that when the torsion spring is wound, it tends to rotate the chain winding member 30 relatively to the bearing support 26.

The chain 20 is secured as by a pin 45 to the disk 31 of the chain winding member 30, passing through one of four bored openings 46 in the disk 31. It is obvious now that the torque of the torsion spring acting to rotate the chain winding member 30 and its disk 31, is effective to wind the chain 20 on disk 31 and thus absorb the slack therein, all as is probably best illustrated in Fig. 2 wherein a considerable amount of slack is shown taken up by my chain winding member. Since the operation and desirability of my invention will now be apparent, I believe that no further description is necessary.

I now claim:

1. In a truck of the class described having a carriage mounted for vertical movement on said truck, a sprocket chain secured at one end to said carriage and applied about a power sprocket on said truck whereby rotation of said sprocket pulls said chain and lifts said carriage relatively to said truck, the slack side of said chain extending from said sprocket back to said carriage, a chain winding member to which the end of the slack side of said chain is secured, the surface of said chain winding member being formed for cooperation with the parts of said chain for holding said chain in predetermined vertical alignment with said chain winding member, means mounting said chain winding member for rotation on said carriage whereby to wind the slack end of said chain about said member, and a spring for rotating said member.

2. In a truck of the class described having a carriage mounted for vertical movement on said truck, a sprocket chain secured at one end to said carriage and applied about a power sprocket on said truck whereby rotation of said sprocket pulls said chain and lifts said carriage relatively to said truck, the slack side of said chain extending from said sprocket back to said carriage, a chain winding member to which the end of the slack side of said chain is secured, said chain winding member having a disk portion the periphery of which coacts with said chain and is of such thickness as to lie between the outer plates of the links of said chain to hold said links against lateral movement off said disk, means mounting said chain winding member for rotation on said carriage whereby to wind the slack end of said chain about said disk, and a spring for rotating said member.

3. In a truck of the class described having a carriage mounted for vertical movement on said truck, a sprocket chain secured at one end to said carriage and applied about a power sprocket on said truck whereby rotation of said sprocket pulls said chain and lifts said carriage relatively to said truck, the slack side of said chain extending from said sprocket back to said carriage, a chain winding member having a disk portion the periphery of which coacts with said chain and is of such thickness as to lie between the outer plates of the links of said chain to hold said links against lateral movement off said disk, means securing the end of said chain to said disk, means mounting said chain winding member for rotation on said carriage whereby to wind the slack end of said chain about said disk, and a spring for rotating said member.

4. In a truck of the class described having a carriage mounted for vertical movement on said truck, a sprocket chain secured at one end to said carriage and applied about a power sprocket on said truck whereby rotation of said sprocket pulls said chain and lifts said carriage relatively to said truck, the slack side of said chain extending from said sprocket back to said carriage, a chain winding member to which the end of the slack side of said chain is secured, a bearing support for said chain winding member, means securing said bearing support to said carriage, anti-friction bearings between said support and said winding member, means securing said chain winding member for rotation relatively to said bearing support and with said anti-friction bearings between said support and said member, and a torsion spring secured at one end to said bearing support and at its other end to said chain winding member whereby to rotate said member to wind the slack end of the chain thereon.

5. In a truck of the class described having a carriage mounted for vertical movement on said truck, a sprocket chain secured at one end to said carriage and applied about a power sprocket on said truck whereby rotation of said sprocket pulls said chain and lifts said carriage relatively to said truck, said sprocket chain being of the type formed of side plates and rollers extending therebetween, the slack side of said chain extending from said sprocket back to said carriage, a chain winding member to which the end of the slack side of said chain is secured, a bearing support for said chain winding member formed on said carriage, the surface of said disk cooperating with the side plates of said sprocket chain for holding said chain in predetermined vertical alignment relatively to said disk, anti-friction bearings between said support and said chain winding member, means securing said chain winding member for rotation relatively to said bearing support and with said anti-friction bearings between said support and said member, and a torsion spring secured at one end to said bearing support and at its other end to said chain winding member whereby to rotate said member to wind the slack end of the chain thereon.

6. In a truck of the class described having a carriage mounted for vertical movement on said truck, a sprocket chain secured at one end to said carriage and applied about a power sprocket on said truck whereby rotation of said sprocket pulls said chain and lifts said carriage relatively to said truck, the slack side of said chain extending from said sprocket back to said carriage, a chain winding member to which the end of the slack side of said chain is secured, said chain winding member having a disk portion for coaction with said chain and of such width as to lie between the outer plates of the links of said chain to hold said links against lateral movement off said disk, a bearing support for said chain winding member formed on said carriage, anti-friction bearings between said support and said chain winding member, means securing said chain winding member for rotation relatively to said bearing support and with said anti-friction bearings between said support and said member, and a torsion spring secured at one end to said bearing support and at its other end to said chain winding member whereby to rotate said member to wind the slack end of the chain on said disk.

7. In a truck of the class described having a carriage mounted for vertical movement on said truck, a sprocket chain secured at one end to said carriage and applied about a power sprocket on said truck whereby rotation of said sprocket pulls said chain and lifts said carriage relatively to said truck, the slack side of said chain extending from said sprocket back to said carriage, a chain winding member to which the end of the slack side of said chain is secured, a bearing support for said chain winding member formed on said carriage and having a surface serving as a race for ball bearings, a beveled surface on said spring winding member cooperable with said ball bearings, a securing device having a complementary beveled surface cooperable with said ball bearings and secured to said chain winding member with said balls held between said complementary surfaces and the race surface of said bearing support whereby to hold said spring winding member in assembled relation to said ball bearings and the bearing support, and a torsion spring secured at one end to said bearing support and at its other end to said chain winding member whereby to rotate said member to wind the slack end of the chain thereon.

8. In a truck of the class described having a carriage mounted for vertical movement on said truck, a sprocket chain secured at one end to said carriage and applied about a power sprocket on said truck whereby rotation of said sprocket pulls said chain and lifts said carriage relatively to said truck, said sprocket chain being of the type formed of side plates and rollers extending therebetween, the slack side of said chain extending from said sprocket back to said carriage, a chain winding disk, means securing the end of the slack side of said chain to said disk with the chain positioned relatively to the disk for winding on the periphery of the disk, the surface of said disk cooperating with the side plates of said sprocket chain for holding said chain in predetermined vertical alignment relatively to said disk, means mounting said chain winding disk for rotation on said carriage whereby to wind the slack end of said chain about the said periphery of said disk, and a spring for rotating said disk.

BRONISLAUS ULINSKI.